(12) United States Patent
Bone et al.

(10) Patent No.: US 8,164,723 B2
(45) Date of Patent: Apr. 24, 2012

(54) LIQUID CRYSTAL DISPLAY HAVING A THIN GASKET AND METHOD FOR MANUFACTURING THE SAME

(75) Inventors: Matthew F. Bone, Fremont, CA (US); Justin John Skaife, Earleville, MD (US)

(73) Assignee: OmniVision Technologies, Inc., Santa Clara, CA (US)

( * ) Notice: Subject to any disclaimer, the term of this patent is extended or adjusted under 35 U.S.C. 154(b) by 897 days.

(21) Appl. No.: 11/787,427

(22) Filed: Apr. 16, 2007

(65) Prior Publication Data

US 2007/0273812 A1 Nov. 29, 2007

Related U.S. Application Data

(63) Continuation-in-part of application No. 11/125,838, filed on May 10, 2005, now abandoned.

(51) Int. Cl.
*G02F 1/1333* (2006.01)
*G02F 1/1339* (2006.01)

(52) U.S. Cl. .......................... 349/122; 349/153
(58) Field of Classification Search .................. 349/122, 349/153
See application file for complete search history.

(56) References Cited

U.S. PATENT DOCUMENTS

| | | | |
|---|---|---|---|
| 5,268,781 A | 12/1993 | Shigeta et al. | |
| 5,644,372 A | 7/1997 | Shinjo et al. | |
| 5,652,634 A | 7/1997 | Hirata et al. | |
| 6,610,782 B1* | 8/2003 | Weiland | 524/837 |
| 6,618,103 B2 | 9/2003 | Hisamitsu et al. | |
| 6,682,786 B1* | 1/2004 | Lien et al. | 428/1.21 |
| 6,922,224 B1* | 7/2005 | Penry et al. | 349/138 |
| 7,253,866 B2* | 8/2007 | Moon et al. | 349/153 |
| 2002/0001056 A1* | 1/2002 | Sandberg et al. | 349/123 |
| 2002/0008809 A1* | 1/2002 | Babuka et al. | 349/73 |
| 2002/0167634 A1* | 11/2002 | Watanabe et al. | 349/153 |
| 2004/0046911 A1 | 3/2004 | McKnight | |
| 2005/0237452 A1* | 10/2005 | Kojima et al. | 349/113 |
| 2006/0256267 A1 | 11/2006 | Bone et al. | |

(Continued)

FOREIGN PATENT DOCUMENTS

| | | |
|---|---|---|
| JP | 04-345126 A | 12/1992 |
| JP | 08-022009 A | 1/1996 |
| JP | 11-015021 A | 1/1999 |
| JP | 11-160711 | 6/1999 |
| JP | 2003-165175 A | 6/2003 |

(Continued)

OTHER PUBLICATIONS

U.S. Appl. No. 11/125,838, Office Action dated Jul. 5, 2007.

(Continued)

*Primary Examiner* — Nathanael R Briggs
(74) *Attorney, Agent, or Firm* — Larry E. Henneman, Jr.; Henneman & Associates, PLC (57) ABSTRACT

A liquid crystal display device includes a substrate, a liquid crystal layer, a liquid crystal alignment layer between the substrate and the liquid crystal layer, a barrier layer between the liquid crystal alignment layer and the liquid crystal layer, and a gasket formed around the perimeter of the liquid crystal layer and abutting the barrier layer. The gasket has a width less than or equal to 400 micrometers. A second substrate also includes a liquid crystal alignment layer and a barrier layer formed over the liquid crystal alignment layer. The gasket also abuts the barrier layer of the second substrate. In a particular embodiment, the substrate is a reflective display backplane, and the second substrate is a transparent substrate having a transparent electrode layer. The gasket of the present invention is much narrower than gaskets of the prior art, which enables LCD devices to be made smaller and cheaper because more LCD devices can be produced per wafer.

51 Claims, 8 Drawing Sheets

U.S. PATENT DOCUMENTS

2007/0099004 A1*  5/2007  Edelmann et al. ............ 428/447
2007/0115398 A1*  5/2007  Harada et al. .................. 349/29

FOREIGN PATENT DOCUMENTS

| JP | 2003-165175 A | 10/2003 |
| TW | 538280 B | 6/2003 |
| WO | WO 2005/040294 | 5/2005 |
| WO | WO 2005/040294 A1 | 5/2005 |
| WO | WO 2006/121988 | 11/2006 |

OTHER PUBLICATIONS

U.S. Appl. No. 11/125,838, Office Action dated Jan. 25, 2008.
U.S. Appl. No. 11/125,838, Office Action dated Nov. 4, 2008.
U.S. Appl. No. 11/125,838, Office Action dated Jul. 21, 2009.
PCT Application No. PCT/US2006/017649, International Search Report and Written Opinion dated Jul. 18, 2007.
PCT Application No. PCT/US2006/017649, International Preliminary Report on Patentability dated Nov. 22, 2007.
CN Application No. 200680021588.2, Office Action dated Feb. 26, 2009.
CN Application No. 200680021588.2, Office Action dated Jul. 31, 2009.
TW App. No. 095115718, Office Action mailed Aug. 27, 2010 (TW year 99).
JP Application No. 2008-511220, Office Action dated Oct. 31, 2011.
TW Application No. 095115718, Office Action dated Aug. 27, 2010.

* cited by examiner

LIQUID CRYSTAL DISPLAY HAVING A THIN GASKET AND METHOD FOR MANUFACTURING THE SAME

This application is a continuation-in-part of U.S. patent application Ser. No. 11/125,838, filed May 10, 2005 now abandoned by the same inventors, which is incorporated herein by reference in its entirety.

BACKGROUND OF THE INVENTION

1. Field of the Invention

This invention relates generally to liquid crystal display (LCD) devices, and more particularly to a method of manufacturing LCD devices. Even more particularly the present invention relates to manufacturing processes and the LCD display devices manufactured thereby that decrease the incidence of defects arising over time, including the catastrophic failure of liquid crystal on silicon (LCoS) light valves. Furthermore, the present invention also relates to LCD display devices and manufacturing processes that increase the yield of LCD display devices from a single wafer.

2. Description of the Background Art

Reflective and transmissive liquid crystal display (LCD) devices are used in video projectors, rear projection televisions, computer displays, and so on as a means for producing high quality imagery. Known LCD devices have decreased the size, weight, and overall cost of many electronic products, while at the same time increased the quality of imagery produced when compared to conventional alternatives such as cathode ray tubes (CRT).

Figure 1:
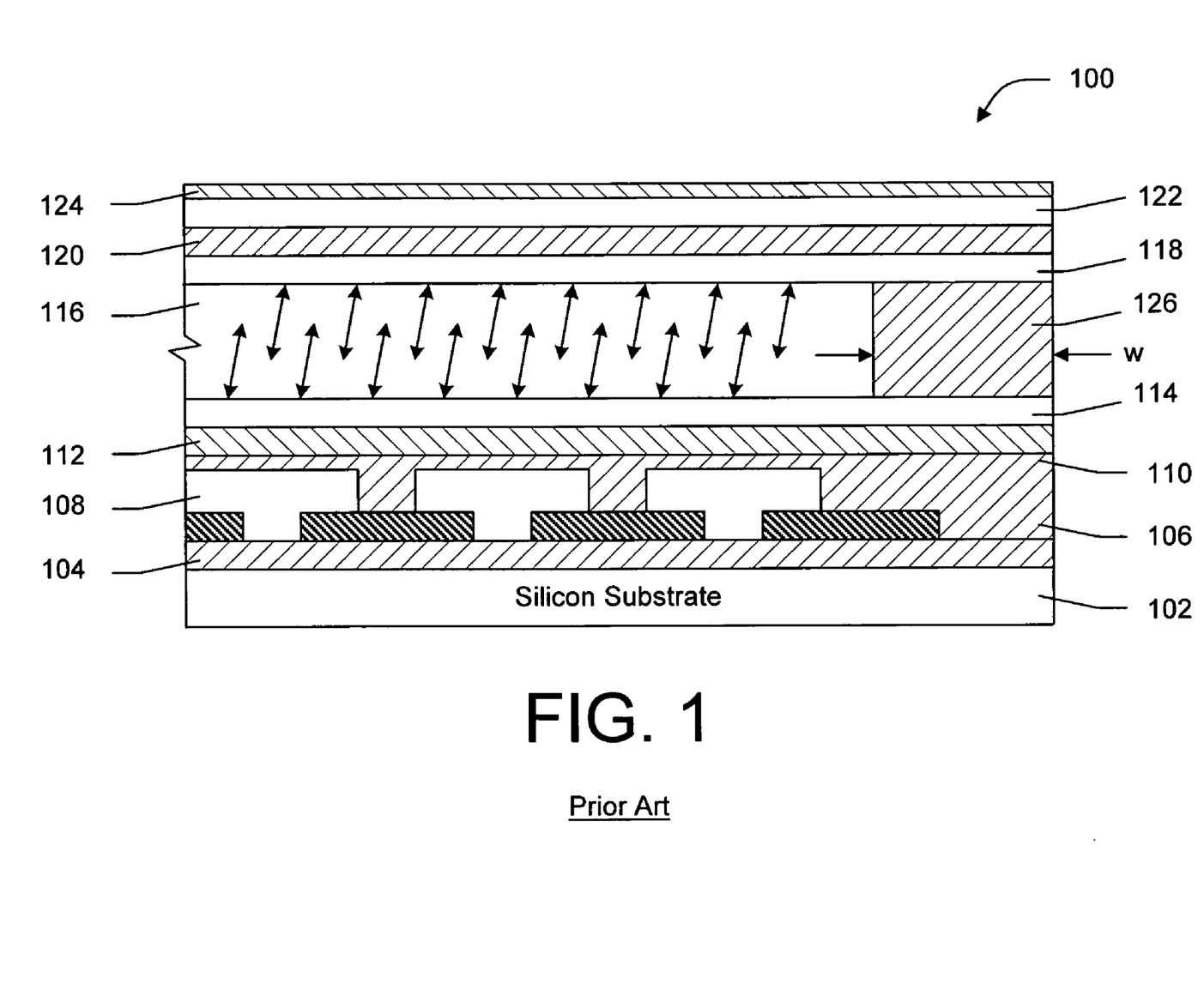
FIG. 1 is a cross-sectional view of a prior art liquid crystal display (LCD) device.

FIG. 1 shows a reflective liquid crystal on silicon (LCoS) light valve 100, which is a known type of LCD device. Display device 100 is formed on a silicon substrate 102, and includes an integrated circuitry layer 104, insulating layer 106, a plurality of pixel mirrors 108, a planarized layer 110, a protective coating 112, a lower liquid crystal alignment layer 114, a liquid crystal layer 116, an upper liquid crystal alignment layer 118, transparent electrode layer 120, a transparent (e.g., glass) substrate 122, an anti-reflective coating 124, and a gasket 126. The thicknesses of the layers depicted in FIG. 1 are not shown to scale, but are instead exaggerated so as to be more clearly visible.

Mirrors 108 are coupled to circuitry layer 104 through a plurality of vias formed in insulating layer 106. Planar layer 110 and protective layer 112 provide a flat, relatively robust surface for subsequent layers of the device. The thickness of planar layer 110 and protective layer 112 over mirrors 108 are on the order of optical thin film coatings. Alignment layers 114 and 118 help to properly align the liquid crystals of layer 116. Transparent electrode 120 (e.g., Indium Tin Oxide) is formed on the bottom surface of glass substrate 122, and anti-reflective coating 124 is formed on the top surface. Alignment layer 118 is formed on transparent electrode 120.

During operation, light passes through all upper layers 124, 122, 120, 118, 116, 114, 112, and 110 of device 100 to impinge on pixel mirrors 108, is reflected from the top surfaces of mirrors 108, and then exits the device again passing through upper layers 110, 112, 114, 116, 118, 120, 122, and 124. The polarization of the light is altered by liquid crystal layer 116, depending on the electrical field across liquid crystal layer 116. When transparent electrode 120 is held at a particular voltage, the electrical field across liquid crystal layer 116 is controlled by the voltages asserted on pixel mirrors 108 by circuitry layer 104. Thus, the polarization of spatially pixilated portions of the incident light can be individually modulated.

Alignment layers 114 and 118 provide a means of aligning the nematic liquid crystals of liquid crystal layer 116. This alignment is accomplished by inducing a topographical asymmetry in the surface. The surface asymmetry causes the liquid crystal molecules to be pinned at the surface. Consequently the bulk orientation of the LC is controlled by the surface orientation.

One known method for forming alignment layers includes forming a polyimide layer and then mechanically rubbing the polyimide layer in a predetermined direction to create the surface asymmetry. One common limitation of polyimide alignment layers is that they are not very stable under high intensity illumination.

To address the limitations of polyimide alignment layers, evaporated thin film alignment layers were developed. These evaporated thin film layers are typically formed from oblique evaporation of silicon oxide (SiO) or silica ($SiO_2$). The evaporated thin film layers have been found to create very stable alignments under high intensity illumination. This is very important for consumer TV applications and so it is the preferred method of alignment for LCOS displays.

A problem has arisen, however, with devices incorporating evaporated thin film alignment layers. In particular, the pretilt angle (a property of the liquid crystal material in the liquid crystal layer) is observed to change over time, thereby changing the performance of the display. This change affects both the contrast and color of the projected image and so is deemed unacceptable for consumer applications. The gradual failure of LCD devices appearing over time can be particularly costly and bothersome to manufacturers because the devices will most likely have been incorporated into other products by the time the defects become apparent. Then, failure of the device can result in diminished optical performance of the product, costly warranty repairs, and/or costly product recalls.

Gasket 126 contains and seals the liquid crystal layer 116. Gasket 126 is formed between alignment layers 114 and 118 and around the liquid crystal layer 116. In particular, gasket 126 surrounds the active pixel area of LCD device 100. Despite the sealing properties of gasket 126, LCD device 100 will still experience performance degradations over time.

Another problem associated with gasket 126 is that in prior art devices gasket 126 must be relatively wide and takes up a large amount of area on LCD device 100. Accordingly, LCD device 100 must be made large enough to accommodate gasket 100 around its active pixel area. For example, prior art gaskets, like gasket 126, are manufactured to a width (w) of 800 micrometers (0.0315 inches) or greater. Indeed, gasket widths greater than 1000 micrometers are common. As a result, up to 50% of the area of the LCD device can be devoted to gasket contact area. This in turn significantly reduces the number of display devices that can be produced from a single silicon wafer.

What is needed, therefore, is a method of manufacturing an LCD device that is less likely to have initial image defects and less prone to future failure. What is also needed is a method for forming an alignment layer in an LCD device that does not adversely affect device yield or useful life. What is also needed is an LCD device that is less prone to future failure than known devices. What is also needed is an LCD device and method of manufacturing the same that results in a greater yield of LCD devices per wafer.

SUMMARY

The inventors have found that the catastrophic failure of many LCD display devices arising over time is much more prevalent when environmental stress factors such as heat and humidity are present. Further investigation lead to the discovery of trace impurities inside the liquid crystal layer. The inventors realized that trace impurities (e.g., water vapor) were being absorbed into or adsorbed onto the thin film liquid crystal alignment layers. The absorption and/or adsorption of impurities interferes with the function of the alignment layers and causes perceptible image defects. In some cases, non-uniform layers of impurity deposits form on the liquid crystal alignment layers. The non-uniform impurity deposit layers consequently result in a skewing of the alignment of the liquid crystals within the liquid crystal layer, resulting in perceptible image defects and/or catastrophic failure of the device.

The present invention overcomes the problems associated with the prior art by providing an LCD device with a barrier layer between the obliquely evaporated liquid crystal alignment layer and the liquid crystal layer. Furthermore, the addition of the barrier layers in the LCD device permit the width of the gasket surrounding the liquid crystal layer to be significantly reduced, thereby enabling smaller LCD devices to be manufactured and associated material costs to be reduced.

In a particular embodiment, the LCD device includes a substrate, a liquid crystal layer, a liquid crystal alignment layer between the substrate and the liquid crystal layer, a barrier layer between the liquid crystal alignment layer and the liquid crystal layer, and a gasket disposed around the perimeter of the liquid crystal layer and abutting the barrier layer. The LCD device also includes a second substrate disposed on an opposite side of the liquid crystal layer as the first substrate, a second liquid crystal alignment layer between the second substrate and the liquid crystal layer, and a second barrier layer between the second liquid crystal alignment layer and the liquid crystal layer. The second barrier layer also abuts the gasket disposed around the liquid crystal layer.

The substrate can be either a reflective substrate or a transmissive substrate. For example, in one embodiment, the substrate is a reflective display backplane formed on a silicon substrate and including a circuitry layer and a plurality of reflective pixel mirrors. The barrier layer can also be formed on transparent substrates including, but not limited to, the transparent electrode of a reflective LCD and the transparent electrodes of transmissive LCDs. Thus, it is expected, but not essential, that devices will generally include two barrier layers, one on a substrate on one side of the liquid crystal layer and one on the substrate on the opposite side of the liquid crystal layer.

The barrier layer protects the liquid crystal alignment layer without interfering with its function. The barrier layer is more resistant to at least one of the adsorption or absorption of impurities than the liquid crystal alignment layer. Therefore, it protects the alignment layer by reducing the instances of absorption and adsorption of trace impurities (e.g., water, etc.) into/onto the liquid crystal alignment layer. The barrier layer is sufficiently thin that it also communicates the anisotropic properties of the liquid crystal alignment layer to the liquid crystal layer, and so does not interfere with its function. For example, in a disclosed embodiment, the barrier layer is a monolayer formed directly on the liquid crystal alignment layer and is in direct contact with the liquid crystal layer. In addition to protecting the liquid crystal alignment layers from contamination by impurities, the barrier layers also enhance adhesion with the liquid crystal cell gasket, which is disposed around the perimeter of the liquid crystal layer to retain the liquid crystal layer between the substrates.

The particular composition of the barrier layer will depend upon the composition of the liquid crystal alignment layer and vice versa. In the example embodiments disclosed, the alignment layer is a thin film oxide layer formed from either SiO or $SiO_2$. The barrier layer is a hydrophobic layer formed with one of a silane (e.g., Octyl-Triethoxy-Silane) or a silizane (e.g., Hexamethyldisilizane). Additionally, the reagent can be functionalized with chemical moieties, for example by adding chemical moieties such as $NH_2$, OH, COOH, etc. to a triethoxy class silane such as Octyl-Triethoxy-Silane. The modification of the reagent facilitates tailoring characteristics of the barrier layer including, but not limited to, liquid crystal surface interaction, moisture adsorption, glue adhesion, and so on.

The barrier layer also permits the width of the gasket of the present invention to be substantially reduced and still protect the liquid crystal layer. In a particular embodiment, the width of the gasket is not greater than 400 micrometers. In a more particular embodiment, the gasket is no wider than 300 micrometers. In addition, if the chemical composition of the barrier layer is functionalized with an —$NH_2$ moiety, the adhesion between the gasket and the barrier layer can be significantly strengthened.

The reduced width of the gasket also permits more LCD devices to be produced per wafer. For example, 129 prior-art LCD devices having an active diagonal dimension of 14 millimeters (0.55 inches) and a gasket width of 800 micrometers can fit on a standard silicon wafer. In contrast, 160 LCD devices of the present invention having a gasket width of 300 micrometers can fit on the same wafer. As another example of the present invention, 168 LCD devices could fit on a standard wafer if the gasket width was 300 micrometers and the LCD devices were manufactured in a portrait configuration. Therefore, the LCD devices of the present invention and the associated manufacturing methods provide a significant increase in device yield over the prior art.

A method of manufacturing a liquid crystal display device is also disclosed. The method includes providing a substrate, forming a liquid crystal alignment layer over the substrate, forming a barrier layer over the liquid crystal alignment layer, and forming a liquid crystal layer over said-barrier layer. In a particular method, two substrates are provided, one substrate being a reflective display backplane and the other being a transparent substrate suitable for use as a transparent electrode. A separate liquid crystal alignment layer is formed over each substrate, and a separate barrier layer is formed over each liquid crystal alignment layer. Then, the liquid crystal layer is formed on the barrier layer of one of the substrates, and the other of the substrates is mounted such that the barrier layers of the respective substrates face one another with the liquid crystal layer disposed there between. A more particular method further includes the step of forming a gasket having a maximum width of 400 micrometers around the perimeter of the LCD device and between the barrier layers. The gasket can be formed before or after the step of forming the liquid crystal layer.

In a particular method, the barrier layer is formed directly on the liquid crystal alignment layer, and the liquid crystal layer is in direct contact with the barrier layer. The step of forming the liquid crystal alignment layer includes, for example, forming a thin film oxide layer of SiO or SiO2. The film is typically applied at an oblique angle.

The step of forming the barrier layer includes forming a layer that is capable of communicating the anisotropic properties of the liquid crystal alignment layer to the liquid crystal layer, and that is more resistant to at least one of the adsorption or absorption of impurities than the liquid crystal alignment layer. For example, in one particular method, the liquid crystal alignment layer is an oxide layer and the barrier layer is a hydrophobic chemical that is applied using vapor prime process. As another example, the step of forming the barrier layer includes forming a monolayer on said liquid crystal layer with a silane (e.g., Octyl-Triethoxy-Silane) or a silizane (e.g., Hexamethyldisilizane).

Optionally, the liquid crystal alignment layer is plasma cleaned prior to forming the barrier layer. The inventors have found that the step of plasma cleaning reduces the instances of device failure and increases the functional life of an LCD device. Indeed, these benefits are provided in varying degrees even without the addition of a barrier layer.

The benefits of the present invention are provided, at least in part, because the barrier layer and/or the plasma cleaning process provide a means for protecting the liquid crystal alignment layer from at least one of the absorption and adsorption of contaminants. The present invention facilitates an increase in the reliability of the devices by reducing the instances of contamination by absorption and/or adsorption of trace impurities during the manufacturing process. The present invention further enhances LCD device reliability, performance, and useful life time, by continuing to prevent contamination of the liquid crystal alignment layers by absorption and/or adsorption of impurities during the useful life of the device.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a means for protecting the liquid crystal alignment layers of a liquid crystal display (LCD) device against contamination that interferes with the communication of the anisotropic properties of the liquid crystal alignment layers to the liquid crystal layer of the device. In the following description, numerous specific details are set forth (e.g., particular methods of forming a barrier layer, particular display type, particular reagents used to form barrier layers, etc.) in order to provide a thorough understanding of the invention. Those skilled in the art will recognize, however, that the invention may be practiced apart from these specific details. In other instances, details of well known LCD display manufacturing practices (e.g., substrate manufacturing, liquid crystal types, liquid crystal cell assembly, electrical connections, etc.) and components have been omitted, so as not to unnecessarily obscure the present invention.

Figure 2:
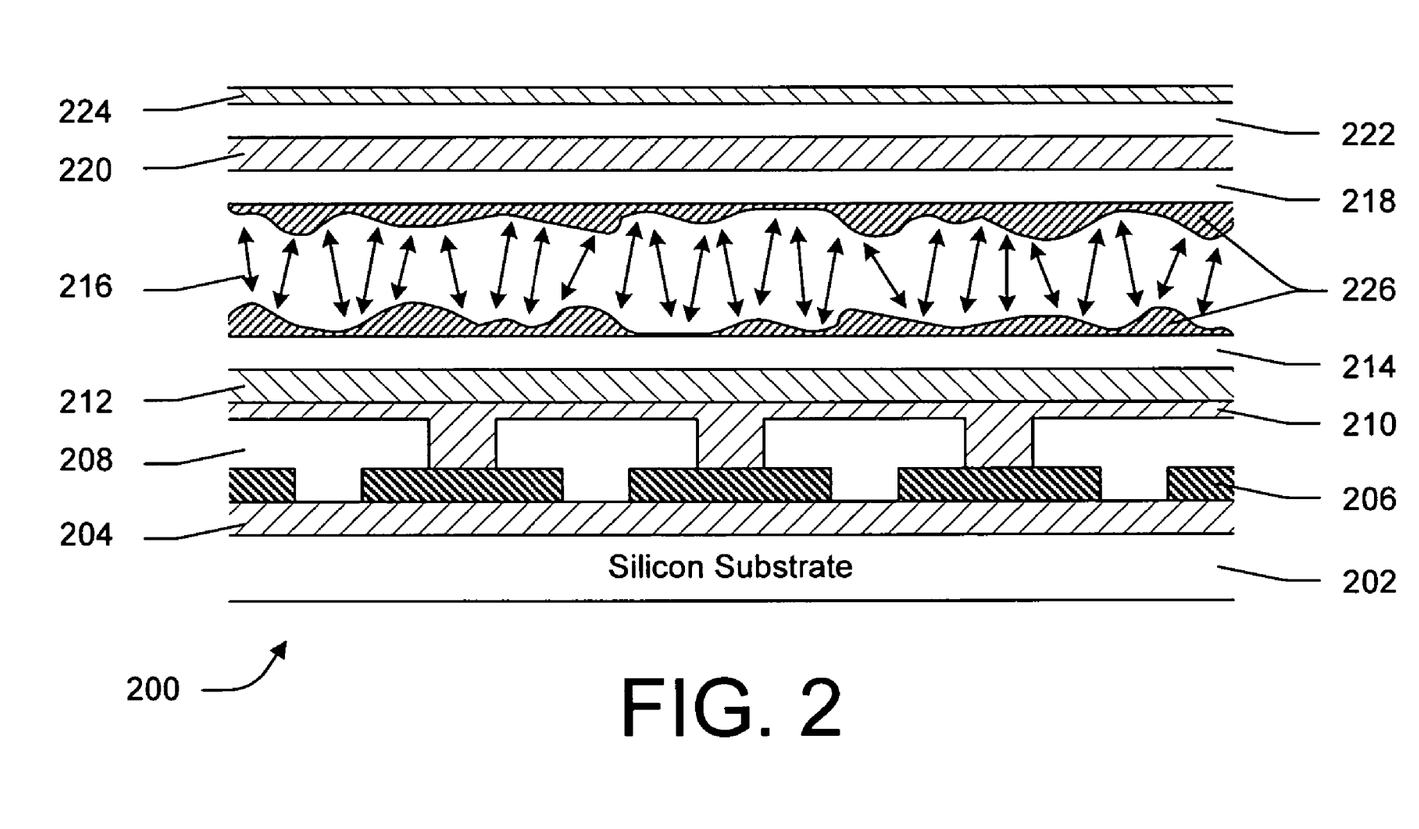
FIG. 2 is a cross-sectional view of a defective LCD device due to impurity layers formed on liquid crystal alignment layers of the device.

FIG. 2 is a cross-sectional view of a reflective LCD device 200, which is formed on a silicon substrate 202 and includes a circuitry layer 204, an insulating layer 206, a plurality of pixel mirrors 208, a planarizing layer 210, a protective cap layer 212, a liquid crystal alignment layer 214, a liquid crystal layer 216, a second liquid crystal alignment layer 218, a transparent electrode 220, a glass substrate 222, and an anti-reflective coating 224. The relative thicknesses of the various layers are not shown to scale in FIG. 2. Instead, the thicknesses of the layers are exaggerated in order to provide a qualitative understanding of the location of the various layers.

The structure and function of the component layers of device 200 are substantially the same as the like component layers of device 100 of FIG. 1. However, FIG. 2 further shows layers of contaminants 226 formed on the liquid crystal alignment layers 214 and 218, which the inventors have determined to be the cause of the unusually high failure rate of certain LCD devices. In particular, contaminants (e.g., water) adsorb onto or absorb into liquid crystal alignment layers 214 and 218 and interfere with the communication of the anisotropic properties of liquid crystal alignment layers 214 and 218 to liquid crystal layer 216. As a result, the liquid crystals of layer 216 do not properly align and, therefore, do not respond uniformly to the application of an electrical field, which causes visibly perceptible defects (e.g., visible domain lines) in images generated by the device.

Impurity layers 226 are shown representationally in FIG. 2. Layers 226 are not intended to show any particular structure or thickness of the adsorbed/absorbed impurities. Rather, impurity layers 226 are merely intended to illustrate that contaminants can interfere with the function of liquid crystal alignment layers 214 and 218. Of course, the particular morphology of contamination deposits will depend on the particular contaminant, the composition of liquid crystal alignment layers 214, 218, and the source of the contamination, etc.

Figure 3A:
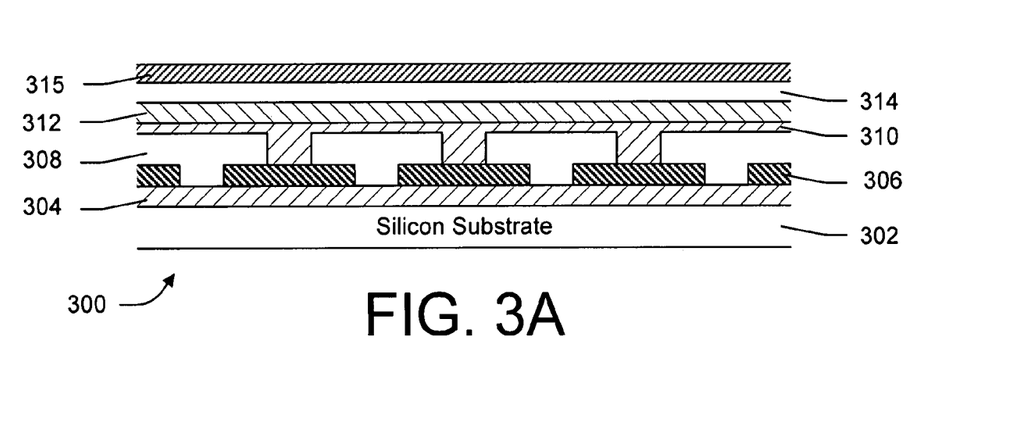
FIG. 3A is a cross-sectional view of a reflective display backplane with a barrier layer formed over the liquid crystal alignment layer.

FIG. 3A is a cross-sectional view of a reflective display backplane 300 formed on a silicon substrate 302 and including an integrated circuitry 304, an insulating support layer 306, a plurality of pixel mirrors 308, a planarized layer 310, and a protective cap layer 312. These layers are those typically present when a reflective display backplane is received from a manufacturer. Additionally, device 300 includes a lower liquid crystal alignment layer 314 that is formed over cap layer 312 and a barrier layer 315 formed over lower liquid crystal alignment layer 314. Except for barrier layer 315, reflective display backplane 300 is substantially similar to known reflective display backplanes. Barrier layer 315 protects liquid crystal alignment layer 314 from contamination and is also capable of communicating the anisotropic properties of liquid crystal alignment layer 314 to an overlying liquid crystal layer 316 (FIG. 3C).

The composition of barrier layer 315 depends on various factors including, but not limited to, the composition of liquid crystal alignment layer 314, the type of liquid crystal material intended to be used, the type of contaminants to which the device may be exposed, and so on. In the particular embodiment described herein, liquid crystal alignment layer 314 is a thermally evaporated thin oxide film such as $SiO_2$ or SiO, which may be susceptible to contamination by water vapor. Barrier layer 315 is a hydrophobic monolayer that protects liquid crystal alignment layer 314 against the adsorption and/or absorption of contaminants including water.

Barrier layer 315 can be formed with a silizane (e.g., Hexamethyldisilizane) or a silane (Octyl-Triethoxy-Silane) reagent. However, it is expected that a silane will provide a benefit over a silizane, because a silane is capable of forming three bonds instead of one and is generally more reactive to the surface of the oxide layer. Further, silanes can be deposited by vapor or liquid deposition, but the inventors have found that vapor deposition provides better coverage and stability.

The structure of a silane is generally understood to include a silicon atom having a carbon chain and three other groups (e.g., ethoxy groups) bonded thereto. During the formation of barrier layer 315, the bonds between the silicon and the ethoxy groups are broken and the silicon forms new bonds with the oxygen atoms of the oxide layer. The carbon chain remains attached to the silicon atom and forms the surface of barrier layer 315. The inventors expect that many different silanes can be used to form barrier layer 315 including, but not limited to, trichlorosilanes, trimethoxysilanes, and triethoxysilanes. Preferably, but not necessarily, the carbon chain is at least four carbons long. The inventors have obtained good results using eight carbon alkyl chains.

The properties of the surface of barrier layer 315 can be customized by attaching different chemical moieties to the carbon chain including, but not limited to, $-NH_2$, $-OH$, and $-COOH$. For example attaching an $-NH_2$ group to the end of the carbon chain opposite the silicon facilitates the formation of a bond between the liquid crystal material of layer 316 and the surface of barrier layer 315. As another example, the $-NH_2$ group facilitates the formation of a bond with the epoxy used to form a retaining gasket around liquid crystal layer 316, thereby preventing the seepage of moisture into liquid crystal layer 316 during the life of the device.

To summarize, barrier layer 315 includes some or all of the following properties. First, barrier layer 315 can protect liquid crystal alignment layer 314 from contamination including moisture, thus extending the life of the device even under environmental stresses such as heat and humidity. Additionally, the surface of barrier layer 315 can be customized through the use of chemical moieties to control aspect of the liquid crystal—surface interaction. Further, barrier layer 315 can provide better adhesion to the liquid crystal cell gasket material. What's more, barrier layer 315 provides these advantages while communicating the anisotropic properties of liquid crystal alignment layer 314 to liquid crystal layer 316.

Figure 3B:
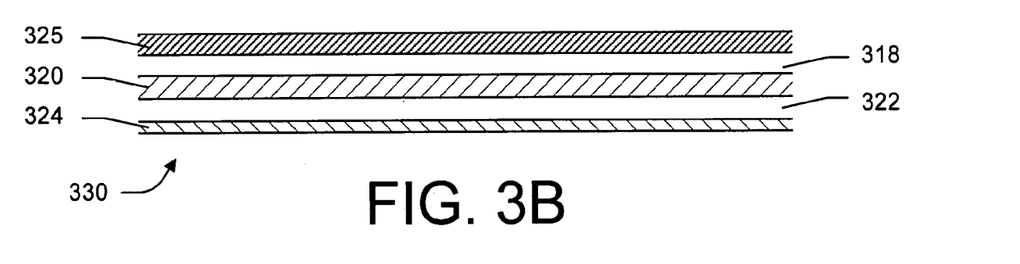
FIG. 3B is an inverted cross-sectional view of a transparent substrate supporting a transparent electrode and a barrier layer formed over a liquid crystal alignment layer.
Figure 3C:
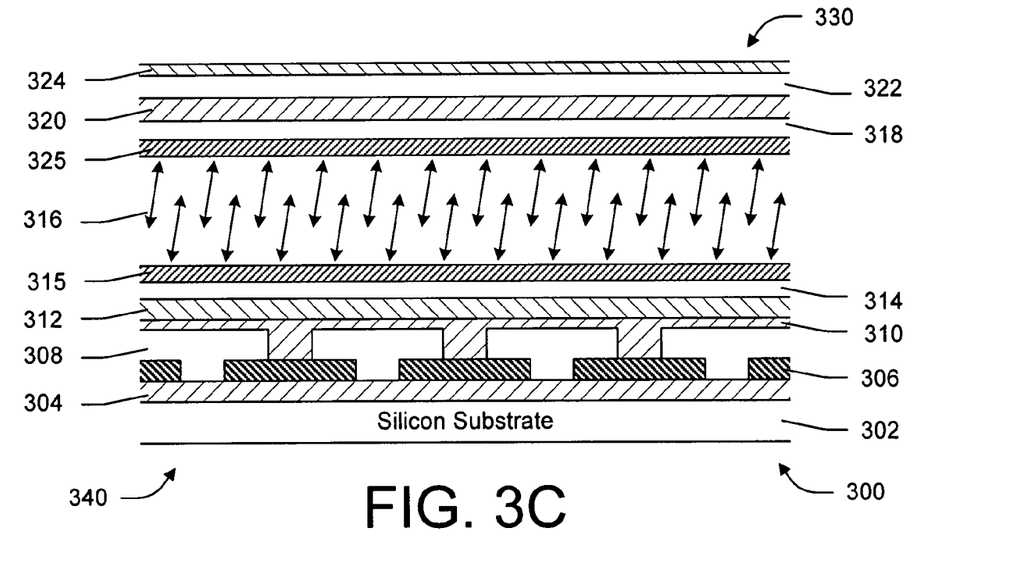
FIG. 3C is a cross-sectional view of an assembled LCD device formed by combining the substrates shown in FIG. 3A and FIG. 3B.

FIG. 3B is a cross-sectional view of a transparent electrode 330, including a glass substrate 322, an anti-reflective coating 324, a transparent conductive layer 320, a liquid crystal alignment layer 318, and a barrier layer 325. Conductive layer 320 and anti-reflective layer 324 are formed on opposite sides of glass substrate 322. Liquid crystal alignment layer 318 is formed over conductive layer 320, and barrier layer 325 is formed directly on liquid crystal alignment layer 318.

The composition of liquid crystal alignment layer 318 and barrier layer 325 are substantially the same as liquid crystal alignment layer 314 and barrier layer 315, respectively. Note however, that the anisotropic properties (e.g., the alignment direction) of alignment layer 314 can be different than the anisotropic properties of alignment layer 318, depending on the design of the particular LCD. Similarly, the properties of barrier layer 315 (e.g., the presence of surface customizing moieties) can be different that the properties of barrier layer 325.

FIG. 3C is a cross-sectional view of an assembled LCD device 340 formed by applying liquid crystal layer 316 over barrier layer 315 of reflective backplane substrate 300, and then mounting transparent electrode 330 over liquid crystal layer 116 such that barrier layer 325 is closest to liquid crystal layer 116. Thus, liquid crystal layer 316 is disposed between and in direct contact with two facing barrier layers 315 and 325.

Figure 7A:
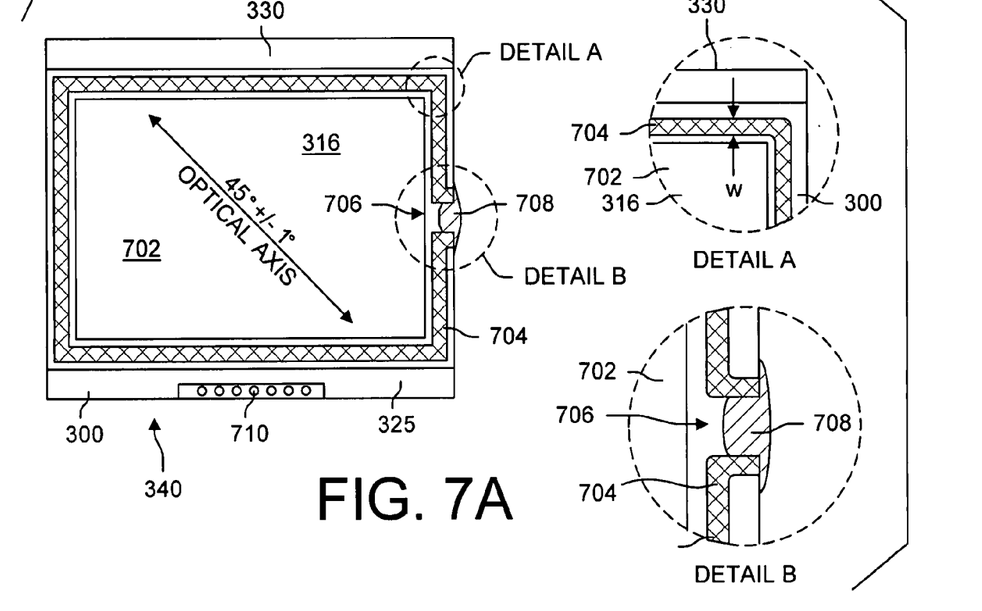
FIG. 7A is a top view of the assembled LCD device of FIG. 3C including a barrier layer and a gasket according to the present invention.

Liquid crystal layer 316 is sealed between reflective display backplane 300 and transparent electrode 330 by a gasket (FIG. 7), which also fixes reflective display backplane 300 to transparent electrode 330. The gasket is formed with an epoxy on barrier layer 315 around the perimeter of the array of pixel mirrors 308 so as to form a reservoir for the liquid crystal material. After the volume defined by the gasket is filled with the liquid crystal material, transparent electrode 330 is placed over the liquid crystal material with barrier layer 325 in contact with the gasket. As the epoxy cures, the gasket bonds to barrier layers 315 and 325, sealing the liquid crystal material there between. Alternatively, the volume defined by the gasket can be filled with liquid crystal material after transparent electrode 330 is bonded to the gasket.

Figure 4:
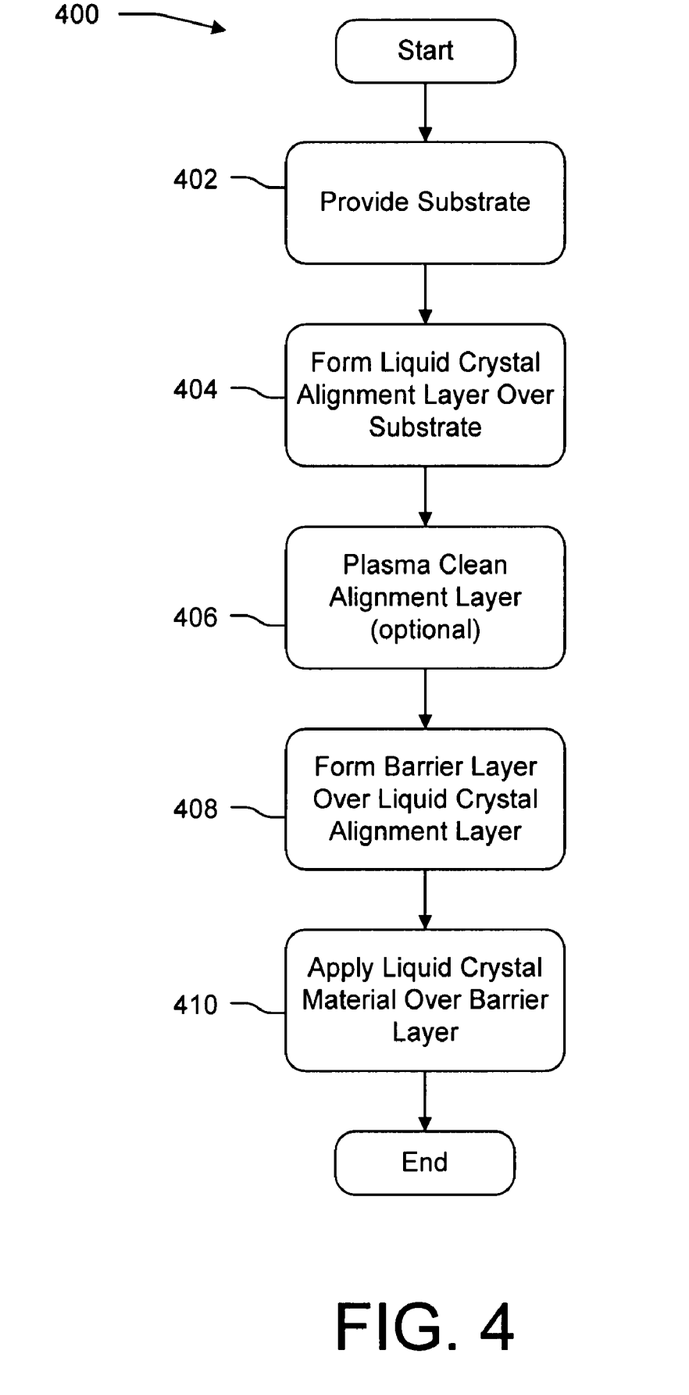
FIG. 4 is a flow chart summarizing one method of manufacturing a liquid crystal display device according to the present invention.

FIG. 4 is a flow chart summarizing one method 400 of manufacturing a liquid crystal display device according to the present invention. In a first step 402, a substrate (e.g., a reflective display backplane, a transparent electrode, etc.) is provided. Then, in a second step 404, a liquid crystal alignment layer is formed over the substrate. Next, in an optional third step 406, the liquid crystal alignment layer is plasma cleaned. It should be understood that plasma cleaning reduces the impurities present on the surface of the alignment layer, but is not a necessary step in the formation of a barrier layer. Next, in a fourth step 408, a barrier layer is formed over the liquid crystal alignment layer. Then, in a fifth step 410, liquid crystal material is applied over barrier layer. When step 410 is complete, the substrate (e.g., a reflective display backplane) is ready for assembly with another substrate (e.g., a transparent electrode) having an alignment layer and a barrier layer prepared by the same or similar method, to create an LCD device.

Figure 5:
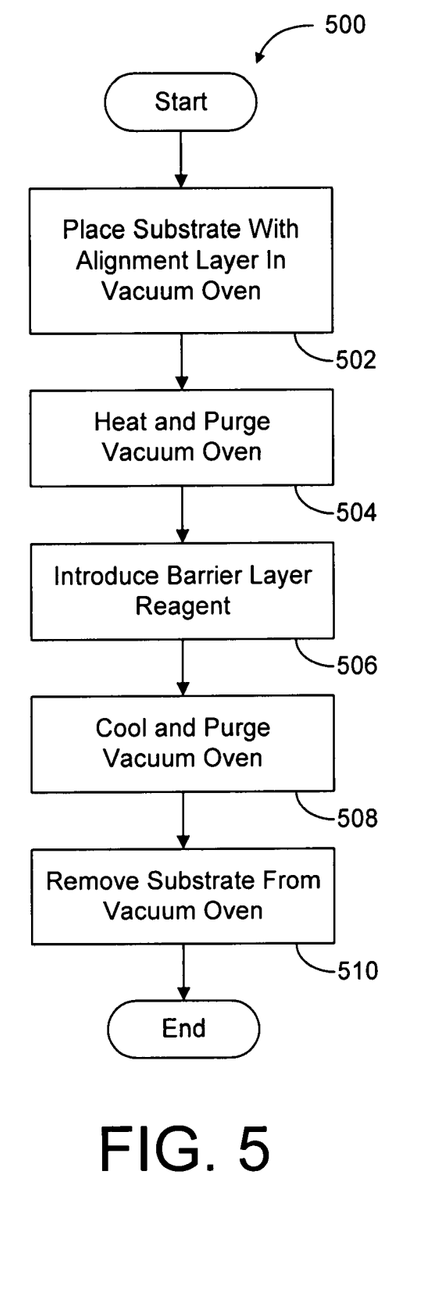
FIG. 5 is a flow chart summarizing one method of forming a barrier layer over a liquid crystal alignment layer as shown in FIG. 4.

FIG. 5 is a flow chart summarizing one method 500 of performing fourth step 408 (form barrier layer over liquid crystal alignment layer) of method 400 of FIG. 4. In a first step 502, a substrate with a liquid crystal alignment layer is placed in a pressure controlled oven. Next, in a second step 504, the oven is heated and purged. The purge step includes, for example, repeatedly pumping the oven down to a pressure of approximately 1 torr and back filling with dry nitrogen. Next, in a third step 506, a barrier layer reagent (e.g., a silane or silizane) is introduced into the oven and the liquid crystal alignment layer is exposed to the reagent for a predetermined period of time. Next, in a fourth step 508, the oven is purged and cooled. Finally, in a fifth step 510, the substrate with the barrier layer formed over the liquid crystal alignment layer is removed from the pressure controlled oven.

Figure 6:
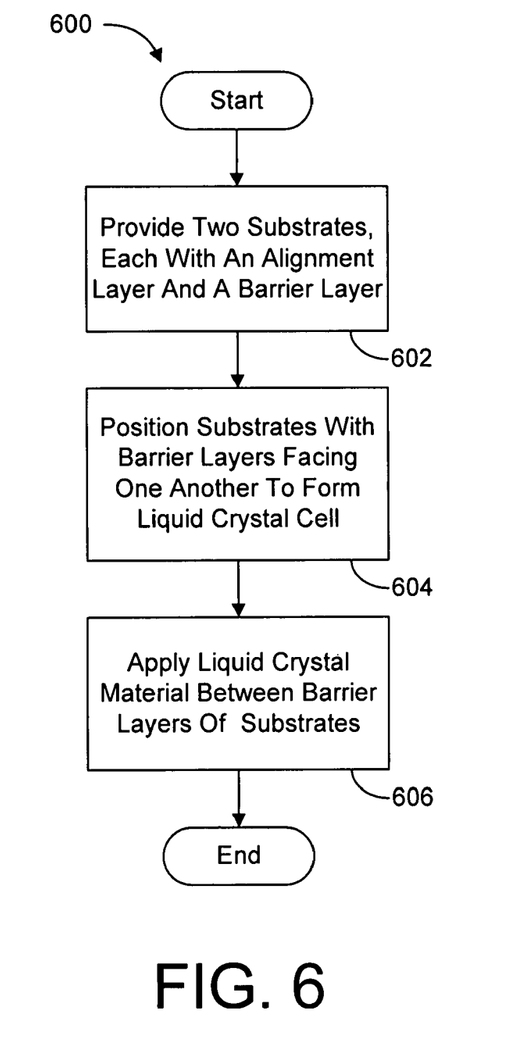
FIG. 6 is a flow chart summarizing one method of assembling an LCD device from two substrates according to the present invention.

FIG. 6 is a flow chart summarizing one method 600 of assembling an LCD device according to the present invention. In a first step, two substrates (e.g., a reflective display backplane and a transparent electrode) are provided, each having a liquid crystal alignment layer and a barrier layer. Next, in a second step 604, the two substrates are fixed in position with respect to one another to form a cell, with their barrier layers facing one another. Finally, in a third step 606, liquid crystal material is injected into the cell between the barrier layers of the substrates.

Figure 7B:
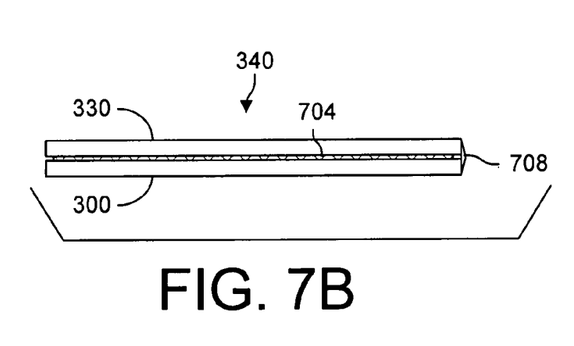
FIG. 7B is a side view of the LCD device of FIG. 7A.
Figure 7C:
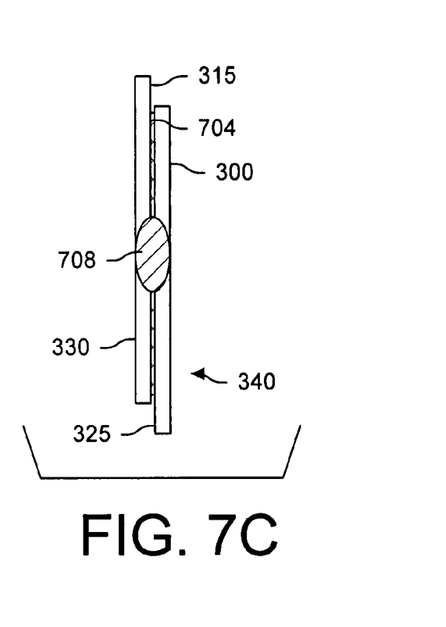
FIG. 7C is an end view of the LCD device of FIG. 7A.

FIGS. 7A-7C show assembled LCD device 340 in greater detail. In particular, FIG. 7A is a top view of assembled LCD device 340 looking down through transparent electrode 330 at reflective backplane 300 and its active pixel area 702. FIG. 7A also includes several detail views showing that assembled LCD device 340 includes a gasket 704 having a width not greater than 400 micrometers. In addition, FIG. 7B is a side view and FIG. 7C is an end view of assembled LCD device 340.

As shown in FIGS. 7A-7C, backplane 300 and transparent electrode 330 are joined together by gasket 704. Gasket 704 is formed between the barrier layers 315 and 325 of backplane 300 and transparent electrode 330, respectively, such that it surrounds the perimeter of the active pixel area 702 of assembled LCD device 340. Accordingly, gasket 704 adheres to the barrier layers 315 and 325 and seals the liquid crystal material in liquid crystal layer 316 within the assembled LCD device 340.

In the present embodiment, gasket 704 is an epoxy. One material that has been found to be suitable is a UV-curable epoxy sealant sold as product number A901432 by Addison Clear Wave of Evanston, Ill.

There are obviously differences between different types of gasket materials. For example, strength of adhesion of some materials can be predicted by observing how a particular material beads up on barrier layers 315 and 325. However, the inventors have determined that the vapor permeability of a gasket material is an important criterion in selecting a gasket material, perhaps more important than its bonding strength.

The gasket can be formed by any suitable method. For example, there are currently at least two standard techniques. In a "dispense" technique, a syringe of the gasket glue is dispensed onto one of the barrier layers 315 or 325, tracing out the final shape of the gasket. In a screen printing technique, the entire gasket is "printed" at once onto the surface of the barrier layer 315 or 325. Both methods work well with barrier layers 315 and 325 and are standard techniques. Indeed, the exact method of applying the gasket material is not an essential aspect of the invention.

Detail A in FIG. 7A shows an enlarged corner of assembled LCD device 340 and gasket 704. As shown in Detail A, gasket 704 resides just outside the active area 702 of liquid crystal layer 316. In addition, Detail A shows that gasket 704 has a width, w, that is much less than the width of prior art gaskets. In particular, gasket 704 has a maximum width of approximately 400 micrometers, which is much narrower than the minimum 800 micrometer gasket widths of the prior art. The smaller width of gasket 704 reduces the overall size of assembled LCD device 340 over LCD devices of the prior art because less area of backplane 300 and transparent electrode 330 are required for gasket adhesion. Accordingly, more assembled LCD devices 340 can be produced per silicon wafer, which results in lower manufacturing costs.

As shown in FIG. 7A and Detail B, gasket 704 further defines an opening 706 that facilitates insertion of liquid crystal material into the LCD device 340 to form liquid crystal layer 316. In the present embodiment, liquid crystal material is introduced into liquid crystal layer 316 through opening 706 after backplane 300 and transparent electrode 330 have been bonded together by gasket 704. Once the liquid crystal layer 316 is filled with liquid crystal material, a plug 708 is formed in opening 706 by placing gasket material (e.g., epoxy) into opening 706. Plug 708 will be drawn into opening 706 by a negative pressure that results when the liquid crystal inside cools slightly. Note that gasket 704 is formed to the edges of backplane 300 and transparent electrode 330 such that a receptacle is formed to bond with plug 708. Plug 708 is also bonded to the outside edges of backplane 300 and transparent electrode 330 as shown in all of FIGS. 7A-7C in order to prevent moisture and other contaminants from seeping into liquid crystal layer 316 through opening 706.

It should be noted that the inventors have found that filling the liquid crystal layer 316 with liquid crystal material after backplane 300 and transparent electrode 330 have been bonded to gasket 704 provides the best seal for liquid crystal layer 316. However, it should also be noted that the liquid crystal layer 316 could be formed before transparent electrode 330 is bonded to gasket 704. In such a case, plug opening 706 may be unnecessary.

Finally, FIG. 7A also shows that backplane 300 includes a plurality of electrical contacts 710 formed in its top surface, such that assembled LCD device 340 can be connected to other display system components (e.g., a display driver). In addition, a similar feature (not shown) may also be included on an exterior surface of transparent electrode 330. As shown in FIG. 7C, backplane 300 and transparent electrode 330 are offset to allow access to electrical contacts 710.

As a result of barrier layers 315 and 325, gasket 704 can be made narrower than conventional gaskets and still provide a means to prevent external contaminants (e.g., water) from entering into the liquid crystal layer 316. Furthermore, as noted above, the bond between barrier layers 315 and 325 and gasket 704 can be strengthened by providing an —$NH_2$ moiety in the chemical composition of the barrier layers 315 and 325. Thus, gasket 704 and barrier layers 315 and 325 prevent contaminants from absorbing into the liquid crystal layer 316 or adsorbing onto the barrier layers 315 and 325, thereby significantly extending the useful lifetime of LCD device 340. In addition, because gasket 704 is able to bond well to barrier layers 315 and 325, it can be made with a maximum width of 400 micrometers or less. Accordingly, gasket 704 increases the LCD device yield from a single wafer during manufacture, which in turn reduces per-unit manufacturing costs.

Figure 8:
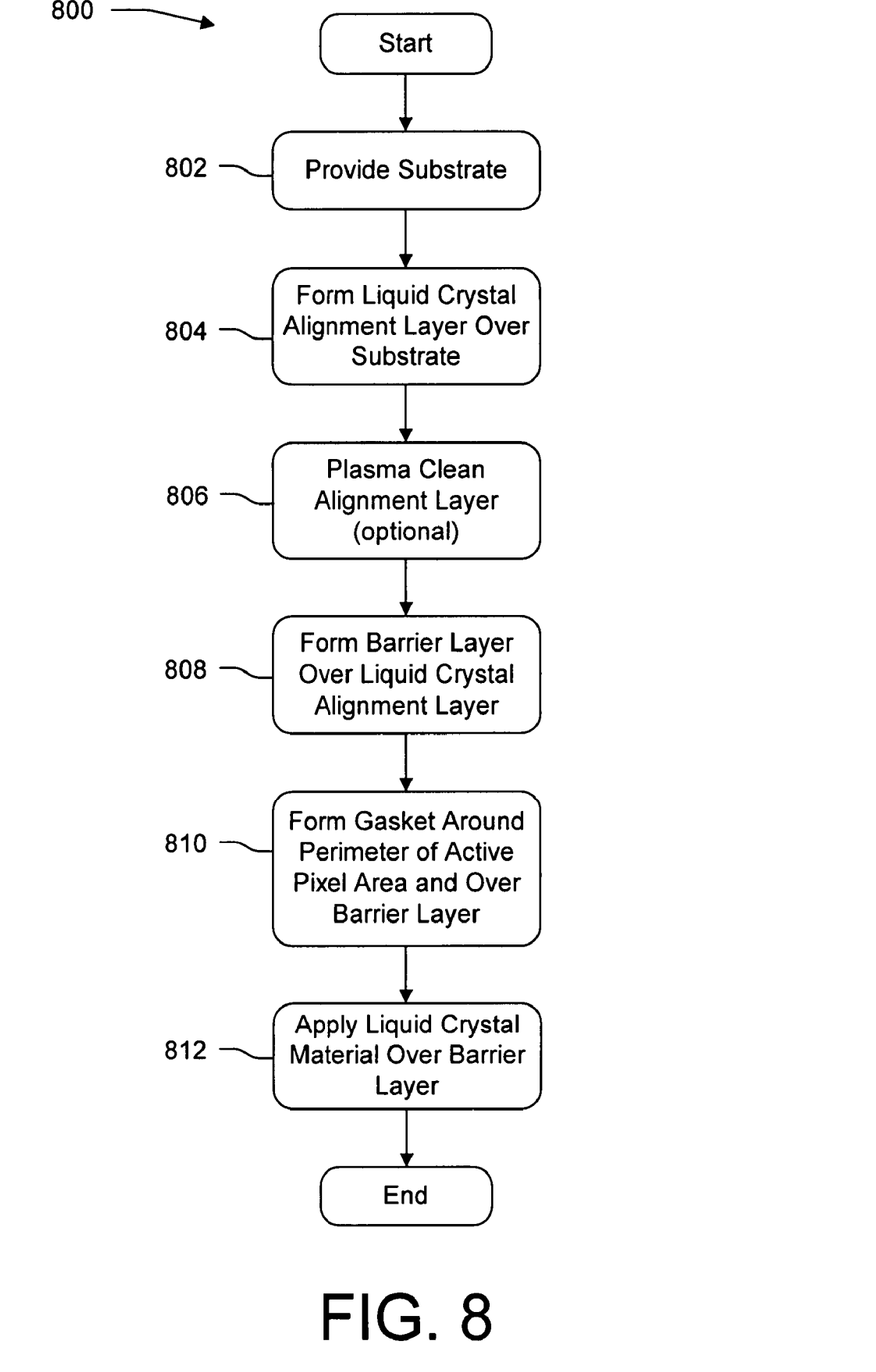
FIG. 8 is a flow chart summarizing one method of manufacturing an LCD device according to the present invention.

FIG. 8 is a flow chart summarizing another method 800 of manufacturing a liquid crystal display device according to the present invention. In a first step 802, a substrate (e.g., a reflective display backplane, a transparent electrode, etc.) is provided. Then, in a second step 804, a liquid crystal alignment layer is formed over the substrate. Next, in an optional third step 806, the liquid crystal alignment layer is plasma cleaned. Next, in a fourth step 808, a barrier layer is formed over the liquid crystal alignment layer. Then, in a fifth step 810, a gasket no greater than 400 micrometers wide is formed over the barrier layer and around the perimeter of an active pixel area (in the case of a backplane) or around the area that the active pixel area will be viewed through (in the case of a transparent electrode). Next, in a sixth step 812, liquid crystal material is applied over the barrier layer and within the space defined by the gasket. When step 812 is complete, the substrate (e.g., a reflective display backplane) is ready for assembly with another substrate (e.g., a transparent electrode) having an alignment layer and a barrier layer prepared by the same or similar method, to create an LCD device.

Figure 9:
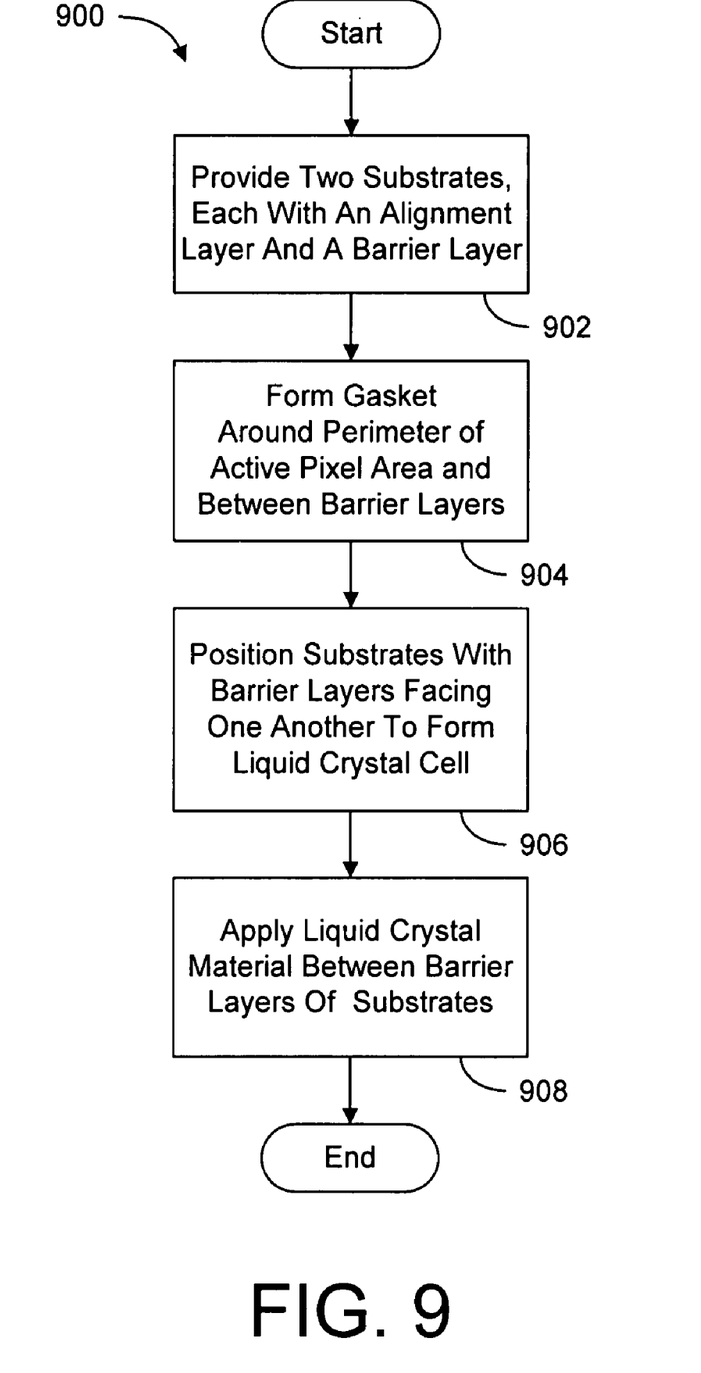
FIG. 9 is a flow chart summarizing one method of assembling an LCD device from two substrates according to the present invention.

FIG. 9 is a flow chart summarizing another method 900 of assembling an LCD device according to the present invention. In a first step 902, two substrates (e.g., a reflective display backplane and a transparent electrode) are provided, each having a liquid crystal alignment layer and a barrier layer. Next, in a second step 904, a gasket no greater than 400 micrometers wide is formed around the perimeter of the active pixel area on the display backplane (or alternatively around the active pixel area viewable through the transparent electrode). Then, in a third step 906, the two substrates are fixed in position with respect to one another to form a cell, with their barrier layers facing one another. Finally, in a fourth step 908, liquid crystal material is injected into the cell between the barrier layers of the substrates and inside the volume defined by the gasket.

The description of particular embodiments and methods of the present invention is now complete. Many of the described features may be substituted, altered or omitted without departing from the scope of the invention. For example, the present invention can be used with alternate backplane configurations and types (e.g., manufactures may vary layering, composition, and materials as needed). As another example, plasma cleaning may be omitted as it is not a necessary step, although it is beneficial to LCD device life and quality. As yet another example, the reagents used in forming a barrier layer over an alignment layer can be changed to suit a particular alignment layer composition, or to obtain a desired characteristic of the barrier layer. Additionally, it should be apparent that these methods and practices can be adapted for use on other types of LCD devices, in addition to the reflective liquid crystal on silicon (LCoS) light valve type illustrated. These and other deviations from the particular embodiments and methods shown will be apparent to those skilled in the art, particularly in view of the foregoing disclosure.

We claim:

1. A liquid crystal display device comprising:
    a substrate;
    a liquid crystal layer;
    a liquid crystal alignment layer between said substrate and said liquid crystal layer;
    a barrier layer between said liquid crystal alignment layer and said liquid crystal layer; and
    a gasket formed from an organic material, said gasket disposed around the perimeter of said liquid crystal layer and abutting said barrier layer, said gasket having a width not greater than 400 micrometers; and wherein
    the adhesion between said gasket material and the material from which said barrier layer is formed is greater than the adhesion between said gasket material and the material from which said liquid crystal alignment layer is formed.

2. A liquid crystal display device according to claim 1, wherein said gasket has a width not greater than 300 micrometers.

3. A liquid crystal display device according to claim 1, wherein the chemical composition of said barrier layer includes an —$NH_2$ moiety.

4. A liquid crystal display device according to claim 1, wherein said substrate is a reflective display backplane.

5. A liquid crystal display device according to claim 4, wherein said reflective display backplane includes:
    a silicon substrate;
    at least one integrated circuitry layer; and
    a plurality of pixel mirrors.

6. A liquid crystal display device according to claim 1, wherein said substrate is a transparent substrate.

7. A liquid crystal display device according to claim 6, further comprising a transparent electrode layer formed on said transparent substrate.

8. A liquid crystal display device according to claim 1, wherein said barrier layer is formed directly on said liquid crystal alignment layer.

9. A liquid crystal display device according to claim 8, wherein said liquid crystal layer is in direct contact with said barrier layer.

10. A liquid crystal display device according to claim 1, wherein said device is a vertically aligned, nematic liquid crystal display device.

11. A liquid crystal display device according to claim 1, wherein said liquid crystal alignment layer is a thin film layer.

12. A liquid crystal display device according to claim 1, wherein said liquid crystal alignment layer includes an oxide layer.

13. A liquid crystal display device according to claim 12, wherein said oxide layer includes at least one of SiO or $SiO_2$.

14. A liquid crystal display device according to claim 1, wherein said barrier layer is more resistant to at least one of the absorption or adsorption of impurities than said liquid crystal alignment layer.

15. A liquid crystal display device according to claim 1, wherein said barrier layer communicates anisotropic properties of said liquid crystal alignment layer to said liquid crystal layer.

16. A liquid crystal display device according to claim 1, wherein said barrier layer is a monolayer.

17. A liquid crystal display device according to claim 1, wherein said barrier layer is formed with one of a silane or a silizane.

18. A liquid crystal display device according to claim 17, wherein said barrier layer is formed with one of Octyl-Tri-ethoxy-Silane (OTS) or Hexamethyldisilizane (HMDS).

19. A liquid crystal display device according to claim 17, wherein said barrier layer is formed with a silane.

20. A liquid crystal display device according to claim 17, wherein the chemical composition of said barrier layer includes an —$NH_2$ moiety.

21. A liquid crystal display according to claim 1, further comprising:
    a second substrate disposed on an opposite side of said liquid crystal layer as said first substrate;
    a second liquid crystal alignment layer between said second substrate and said liquid crystal layer; and
    a second barrier layer between said second liquid crystal alignment layer and said liquid crystal layer; and
    wherein said gasket is disposed between said second barrier layer and said barrier layer.

22. A liquid crystal display according to claim 21, wherein:
    said substrate is a reflective display backplane; and
    said second substrate is a transparent substrate.

23. A method of manufacturing a liquid crystal display device comprising the steps of:
    providing a substrate;
    forming a liquid crystal alignment layer over said substrate;
    forming a barrier layer over said liquid crystal alignment layer;
    forming a liquid crystal layer over said barrier layer; and
    forming a gasket from an organic material in direct contact with said barrier layer and around the perimeter of said liquid crystal layer, said gasket having a width not greater than 400 micrometers; and wherein
    said gasket is formed from a material that provides greater adhesion between said gasket and said barrier layer than between said gasket and said liquid crystal alignment layer.

24. A method of manufacturing a liquid crystal display device according to claim 23, wherein said gasket has a width not greater than 300 micrometers.

25. A method of manufacturing a liquid crystal display device according to claim 23, wherein the chemical composition of said barrier layer includes an —$NH_2$ moiety.

26. A method of manufacturing a liquid crystal display device according to claim 23, wherein said substrate is reflective display backplane.

27. A method of manufacturing a liquid crystal display device according to claim 23, wherein said substrate is a transparent substrate.

28. A method of manufacturing a liquid crystal display device according to claim 23, wherein said step of forming said barrier layer over said liquid crystal alignment layer includes forming said barrier layer directly on said liquid crystal alignment layer.

29. A method of manufacturing a liquid crystal display device according to claim 28, wherein said step of forming said liquid crystal layer over said barrier layer includes applying said liquid crystal layer in direct contact with said barrier layer.

30. A method of manufacturing a liquid crystal display device according to claim 23, wherein:
said step of forming said liquid crystal layer includes forming a nematic liquid crystal layer; and
said step of forming said liquid crystal alignment layer includes forming an alignment layer suitable for use in a vertically aligned liquid crystal display device.

31. A method of manufacturing a liquid crystal display device according to claim 23, wherein said step of forming said liquid crystal alignment layer includes forming a thin film alignment layer.

32. A method of manufacturing a liquid crystal display device according to claim 23, wherein said step of forming said liquid crystal alignment layer includes forming an oxide layer.

33. A method of manufacturing a liquid crystal display device according to claim 32, wherein said oxide layer includes at least one of SiO or $SiO_2$.

34. A method of manufacturing a liquid crystal display device according to claim 23, wherein said step of forming said barrier layer includes forming a layer that is more resistant to at least one of the absorption or adsorption of impurities than said liquid crystal alignment layer.

35. A method of manufacturing a liquid crystal display device according to claim 23, wherein said step of forming said barrier layer includes forming a layer that communicates anisotropic properties of said liquid crystal alignment layer to said liquid crystal layer.

36. A method of manufacturing a liquid crystal display device according to claim 23, wherein said step of forming said barrier layer includes forming a monolayer on said liquid crystal alignment layer.

37. A method of manufacturing a liquid crystal display device according to claim 23, wherein said step of forming said barrier layer includes using at least one of either a silane or a silizane to form said barrier layer.

38. A method of manufacturing a liquid crystal display device according to claim 37, wherein said step of forming said barrier layer includes using at least one of either Octyl-Triethoxy-Silane (OTS) or Hexamethyldisilizane (HMDS).

39. A method of manufacturing a liquid crystal display device according to claim 37, wherein said step of forming said barrier layer includes using a silane to form said barrier layer.

40. A method of manufacturing a liquid crystal display device according to claim 37, wherein the chemical composition of said barrier layer further includes an —$NH_2$ moiety.

41. A method of manufacturing a liquid crystal display device according to claim 23, further comprising:
providing a second substrate;
forming a second liquid crystal alignment layer over said second substrate;
forming a second barrier layer over said liquid crystal alignment layer; and
mounting said second substrate with said second barrier layer facing said barrier layer with said liquid crystal layer disposed there between, said second barrier layer over said gasket.

42. A method of manufacturing a liquid crystal display device according to claim 41, wherein said substrate is a reflective display backplane and said second substrate is a transparent substrate.

43. A method of manufacturing a liquid crystal display device according to claim 23, further comprising performing a plasma cleaning process on said alignment layer prior to forming said barrier layer.

44. A liquid crystal display device including:
a substrate;
a liquid crystal layer;
a liquid crystal alignment layer between said substrate and said liquid crystal layer;
means for preventing contaminants from entering said liquid crystal layer; and
means for protecting said liquid crystal alignment layer from at least one of the absorption and adsorption of contaminants; and wherein
said means for preventing contaminants from entering said liquid crystal layer abuts said means for protecting said liquid crystal alignment layer; and
the adhesion between said means for preventing contaminants from entering said liquid crystal layer and said means for protecting said liquid crystal alignment layer is greater than the adhesion between said means for preventing contaminants from entering said liquid crystal layer and said liquid crystal alignment layer.

45. A liquid crystal display device according to claim 1, wherein:
said gasket is disposed on each side of said liquid crystal layer not contacting another layer of said display device;
an inner surface of said gasket abuts said liquid crystal layer; and
an exterior surface of said gasket is exposed to an external atmosphere.

46. A method of manufacturing a liquid crystal display device according to claim 23, wherein:
said gasket is formed on each side of said liquid crystal layer not contacting another layer of said display device;
an inner surface of said gasket abuts said liquid crystal layer; and
an exterior surface of said gasket is exposed to an external atmosphere.

47. A liquid crystal display device according to claim 1, wherein said gasket provides a long-term viable barrier against humidity and temperature cycling.

48. A liquid crystal display device according to claim 1, wherein:
said substrate includes a plurality of pixels configured to display a complete image; and
said gasket is disposed outside of said plurality of pixels configured to display said complete image.

49. A method of manufacturing a liquid crystal display device according to claim 23, wherein said gasket provides a viable long-term barrier against humidity.

50. A method of manufacturing a liquid crystal display device according to claim 23, wherein:
   said substrate includes a plurality of pixels configured to display a complete image; and
   said gasket is formed outside of said plurality of pixels configured to display said complete image.

51. A method of manufacturing a liquid crystal display device according to claim 23, wherein said substrate is a silicon reflective display backplane.

* * * * *